United States Patent [19]
Barnes et al.

[11] Patent Number: 6,082,331
[45] Date of Patent: *Jul. 4, 2000

[54] ELECTRONIC CONTROL AND METHOD FOR CONSISTENTLY CONTROLLING THE AMOUNT OF FUEL INJECTED BY A HYDRAULICALLY ACTIVATED, ELECTRONICALLY CONTROLLED INJECTOR FUEL SYSTEM TO AN ENGINE

[75] Inventors: Travis E. Barnes, Peoria; Michael S. Lukich, Chillicothe; Brian G. McGee, Chillicothe; John P. Timmons, Chillicothe, all of Ill.

[73] Assignee: Caterpillar Inc., Peoria, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/994,238

[22] Filed: Dec. 19, 1997

[51] Int. Cl.$^7$ .................................................... F02M 39/00
[52] U.S. Cl. ............................................ 123/446; 123/300
[58] Field of Search .................................... 123/446, 299, 123/300, 458, 447; 239/88–95

[56] References Cited

U.S. PATENT DOCUMENTS

| | | | |
|---|---|---|---|
| Re. 33,270 | 7/1990 | Beck et al. | 123/447 |
| 4,922,878 | 5/1990 | Shinogle et al. | 123/490 |
| 5,176,115 | 1/1993 | Campion | 123/179.17 |
| 5,181,494 | 1/1993 | Ausman et al. | 123/446 |
| 5,191,867 | 3/1993 | Glassey | 123/446 |
| 5,341,783 | 8/1994 | Beck | 123/300 |
| 5,357,912 | 10/1994 | Barnes et al. | 123/357 |
| 5,402,760 | 4/1995 | Takeuchi et al. | 123/300 |
| 5,463,996 | 11/1995 | Maley et al. | 123/446 |
| 5,477,828 | 12/1995 | Barnes | 123/446 |
| 5,485,820 | 1/1996 | Iwaszkiewicz | 123/458 |
| 5,492,098 | 2/1996 | Hafner et al. | 123/446 |
| 5,492,099 | 2/1996 | Maddock | 123/446 |
| 5,517,972 | 5/1996 | Stockner | 123/496 |
| 5,564,391 | 10/1996 | Barnes et al. | 123/446 |
| 5,566,660 | 10/1996 | Camplin et al. | 123/496 |
| 5,601,067 | 2/1997 | Wirbeleit | 123/300 |
| 5,632,444 | 5/1997 | Camplin et al. | 239/88 |
| 5,651,345 | 7/1997 | Miller et al. | 123/446 |
| 5,669,355 | 9/1997 | Gibson et al. | 123/446 |
| 5,673,669 | 10/1997 | Maley et al. | 123/446 |
| 5,687,693 | 11/1997 | Chen et al. | 123/446 |
| 5,697,342 | 12/1997 | Anderson et al. | 123/446 |
| 5,717,562 | 2/1998 | Antone et al. | 361/155 |
| 5,730,104 | 3/1998 | Hafner | 123/300 |
| 5,842,452 | 12/1998 | Pattaniak | 123/446 |

FOREIGN PATENT DOCUMENTS

| | | | |
|---|---|---|---|
| 0459429A1 | 12/1991 | European Pat. Off. | F02M 47/02 |
| 08291729 | 11/1996 | European Pat. Off. | F02D 41/02 |
| 2720787 | 12/1995 | France | F02M 65/00 |

*Primary Examiner*—Carl S. Miller
*Attorney, Agent, or Firm*—Byron G. Buck, II

[57] ABSTRACT

An apparatus and method for determining the current waveform of a fuel injection signal so as to consistently control the amount of fuel injected by an electronically controlled hydraulic actuator unit injector fuel system to an engine is disclosed. The apparatus and method varies the waveform of a fuel injection signal using equations or look-up maps and based on sensed operating parameters, which preferably include a desired speed of the engine or desired fuel quantity to be injected during an injection event, actuating fluid pressure and engine speed.

33 Claims, 6 Drawing Sheets

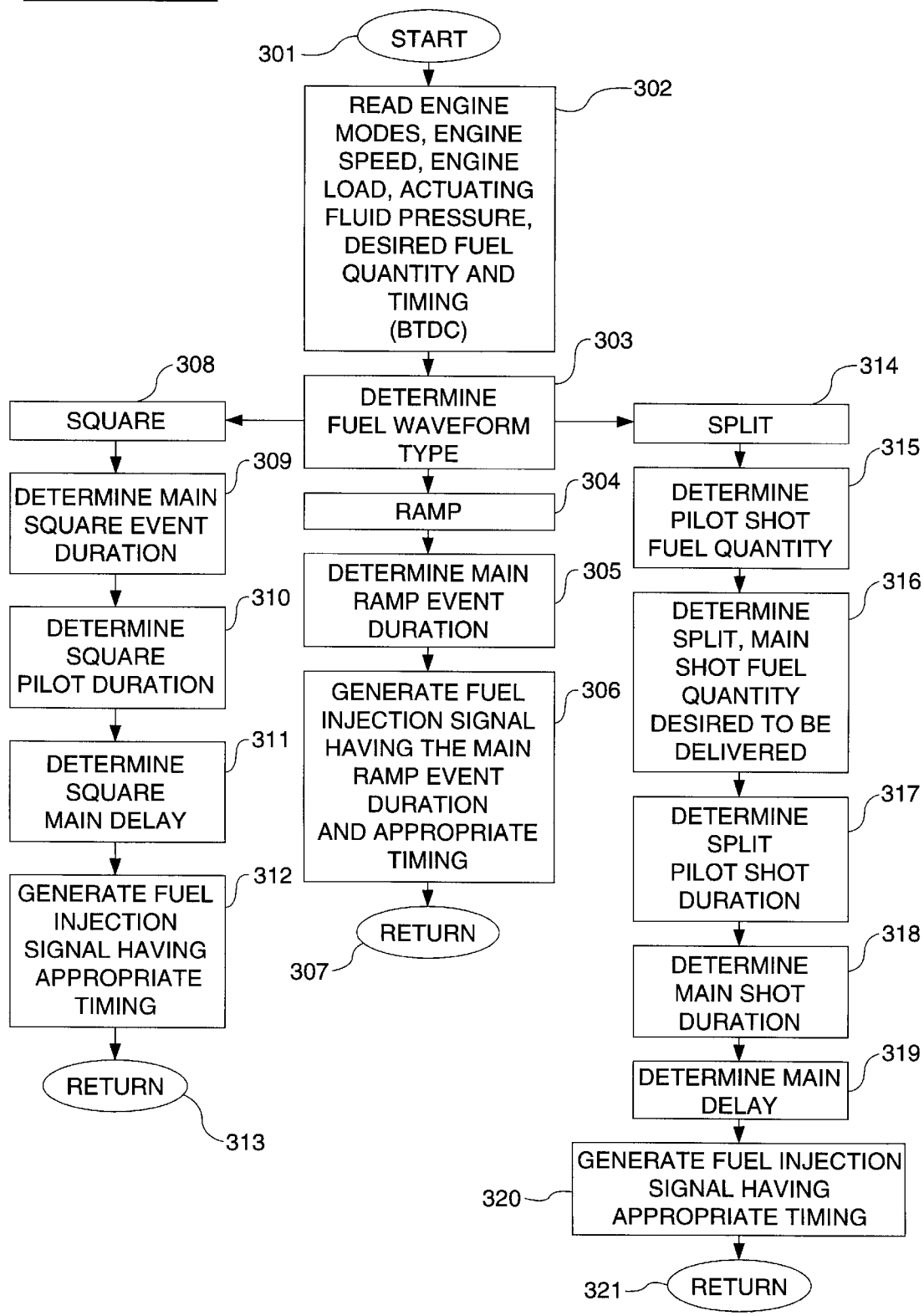

Fig-4-
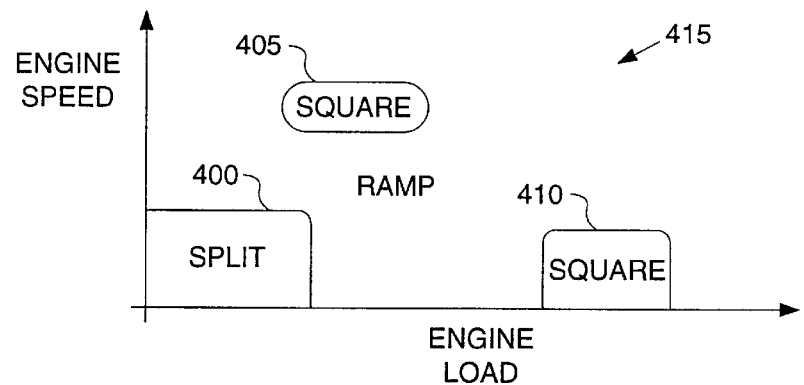
Fig-5-
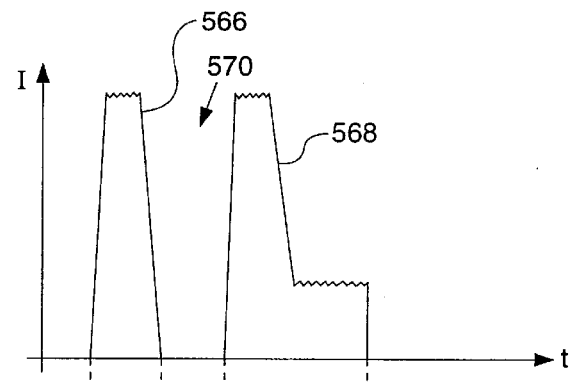
Fig-6-
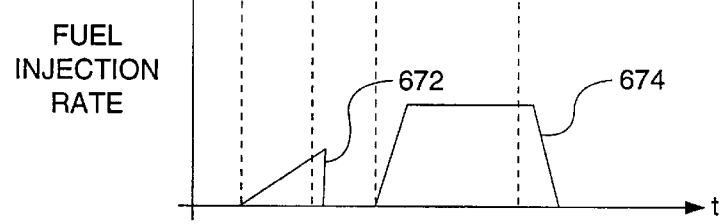

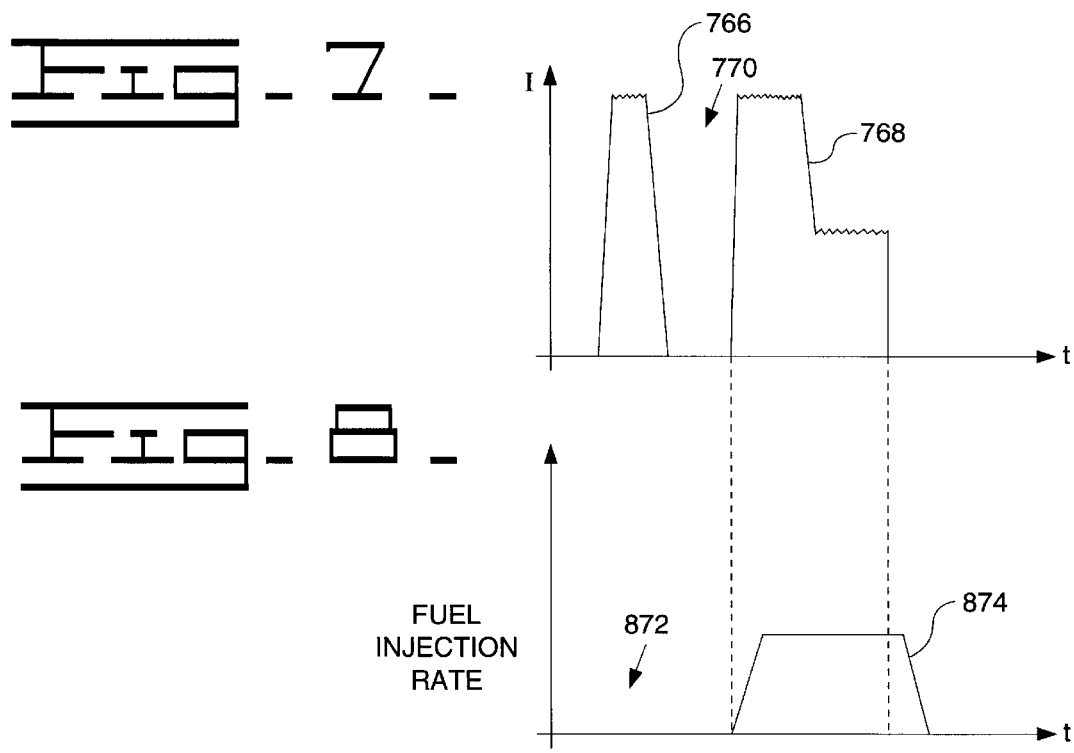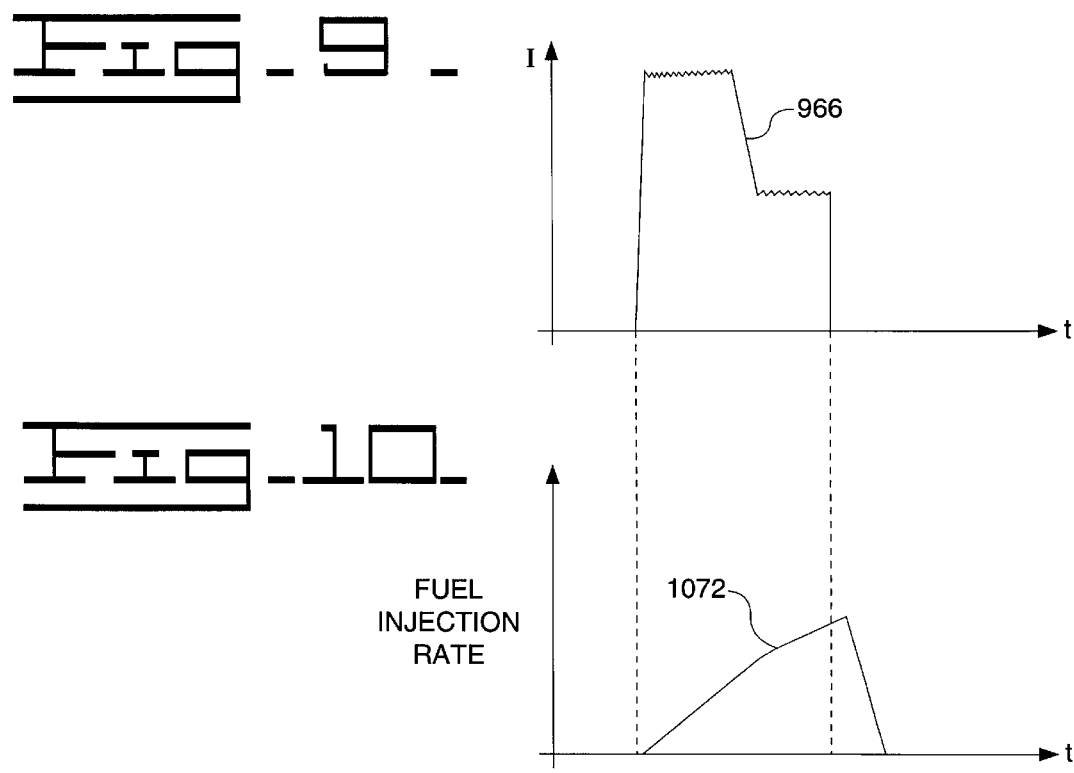

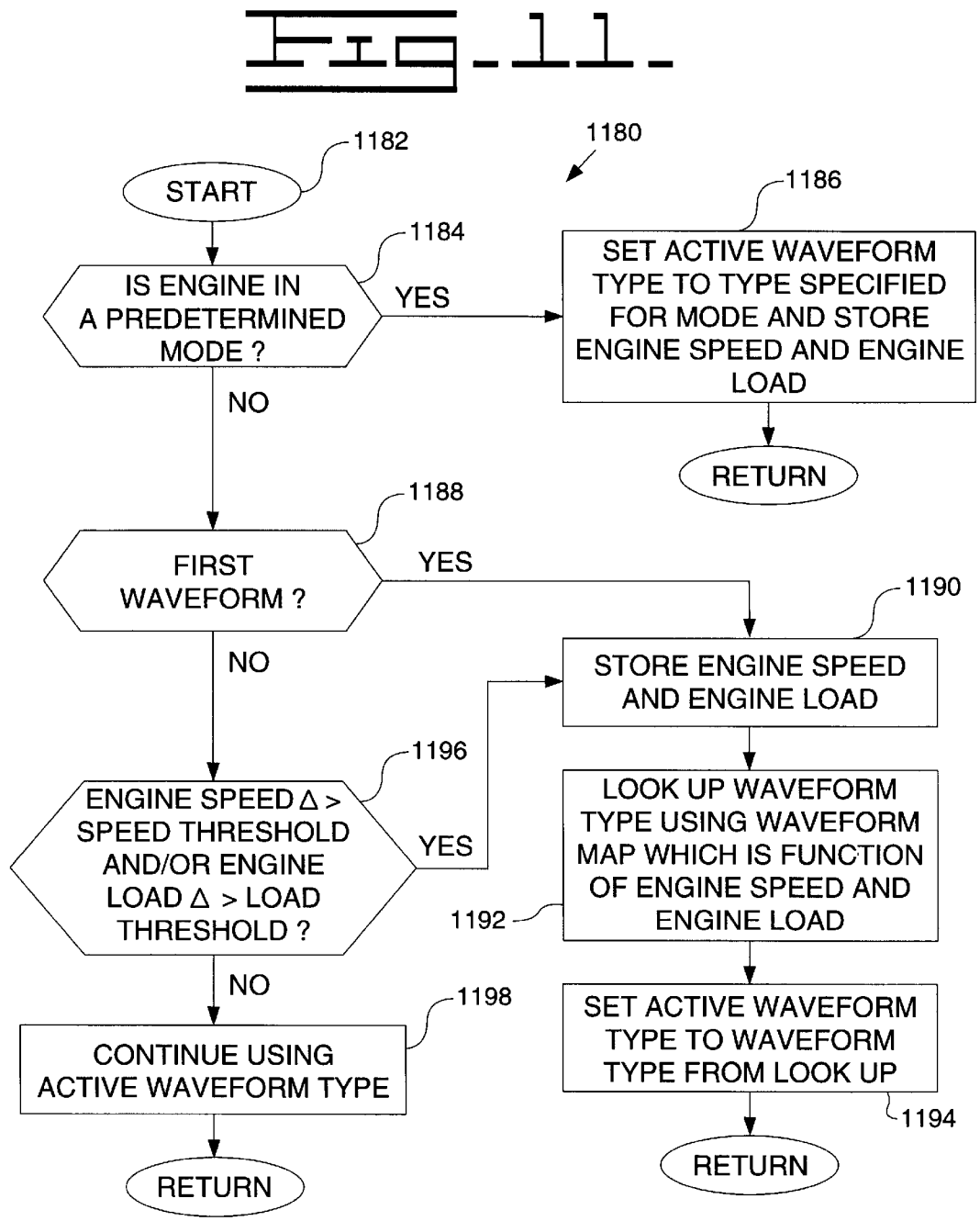

ELECTRONIC CONTROL AND METHOD FOR CONSISTENTLY CONTROLLING THE AMOUNT OF FUEL INJECTED BY A HYDRAULICALLY ACTIVATED, ELECTRONICALLY CONTROLLED INJECTOR FUEL SYSTEM TO AN ENGINE

TECHNICAL FIELD

The present invention related generally to hydraulically actuated electronically controlled fuel injection, and more particularly, to a method and an electronic control system for determining the current waveform of a fuel injection signal so as to consistently control the amount of fuel injected to an engine.

BACKGROUND ART

Electronically controlled fuel injectors typically inject fuel into a specific engine cylinder as a function of a fuel injection signal received from an electronic controller and are well known in the art. An example of a hydraulically actuated electronically controlled unit injector fuel system using hydraulically actuated electronically controlled unit injectors (hereinafter referred to a "HEUI injectors") is shown in U.S. Pat. No. 5,191,867 issued to Glassey on Mar. 9, 1993.

Emission regulations pertaining to engine exhaust emissions are increasingly becoming more restrictive throughout the world, including, for example, restrictions on emission of particulates and $NO_x$. To control the power and emissions output of an internal combustion engine precisely, it is necessary to consistently control the timing and quantity of fuel injected into the engine cylinders. This requires utilizing different fuel injection rate waveform types in order to achieve optimum engine operation and emissions control. Further, tailoring the injection event, including sub-event(s), with respect to the total quantity of fuel delivered to a combustion chamber, injection rate of fuel delivered, portioning of fuel delivered and timing of such aspects of a fuel injection event, is one way in which to meet emission regulations. Therefore, at different engine operating conditions it may be necessary to control particular aspects of a fuel injection event differently.

In the past, hydraulically-actuated electronically-controlled fuel injection systems have included some mechanical limitations on the ability to consistently control aspects of the injection event and consistently provide a variety of achievable fuel injection rate waveform types. In some systems the injectors utilized have also been somewhat limited as to the fuel injection signal current waveform which could be utilized. Resulting problems included variations in the rate of injection like injecting fuel too rapidly within a given injection event, allowing fuel to be injected too soon or beyond a desired stopping point, variations in the pressure of the fuel being injected and variations in the dispersion of the fuel throughout the combustion chamber. Such problems can adversely affect emission outputs and fuel economy.

The present invention is directed to overcoming one or more of the problems as set forth above.

DISCLOSURE OF THE INVENTION

In one aspect, the present invention provides an electronic control system for consistently controlling the amount of fuel injected to an engine by a hydraulically actuated electronic unit fuel injector. The electronic control system includes the electronic fuel injector, an electronic controller, and engine speed sensor, a throttle and a pressure sensor. The electronic fuel injector is mounted to the engine and is connected to a source of actuating fluid. Further, the electronic fuel injector is capable of producing an injection event having sub-events. The engine speed sensor produces an engine speed signal responsive to the speed of the engine and communicates the engine speed to the controller. The throttle produces a desired speed signal indicative of a desired speed of the engine and communicates the desired speed to the controller. The pressure sensor is associated with the actuating fluid, produces a pressure signal responsive to the pressure of the actuating fluid and communicates the pressure signal to the controller. The electronic controller delivers to said hydraulically actuated electronic unit fuel injector, a fuel injection signal having one or more of a plurality waveforms. The waveforms control the sub-events of the fuel injection signal and are generated from one or more of a plurality of fuel delivery maps. The one or more of a plurality fuel delivery maps are a function of the desired speed of the engine, the engine speed and the pressure of the actuating fluid.

These and other aspects and advantages of the present invention will become apparent upon reading the detailed description in connection with the drawings and appended claims.

BRIEF DESCRIPTION OF THE DRAWINGS

For a better understanding of the invention, reference may be made to the accompanying drawings, in which:

FIG. 3 is a flowchart of software logic implemented in a preferred embodiment of the invention;

FIG. 4 is an injection waveform map used in connection with a preferred embodiment of the invention;

FIG. 5 is a graph showing a split type of fuel injection signal used in connection with a preferred embodiment of the invention;

FIG. 6 is a graph of a split fuel injection delivery rate used in connection with a preferred embodiment of the invention;

FIG. 7 is a graph showing a square type of a fuel injection signal used in connection with a preferred embodiment of the invention;

FIG. 8 is a graph of a square fuel injection delivery rate used in connection with a preferred embodiment of the present invention;

FIG. 9 is a graph showing a ramp type of a fuel injection signal used in connection with a preferred embodiment of the present invention;

FIG. 10 is a graph of a ramp fuel injection delivery rate used in connection with a preferred embodiment of the present invention; and FIG. 11 is a flow chart of software logic implemented in a preferred embodiment of the present invention.

BEST MODE FOR CARRYING OUT THE INVENTION

Figure 1:
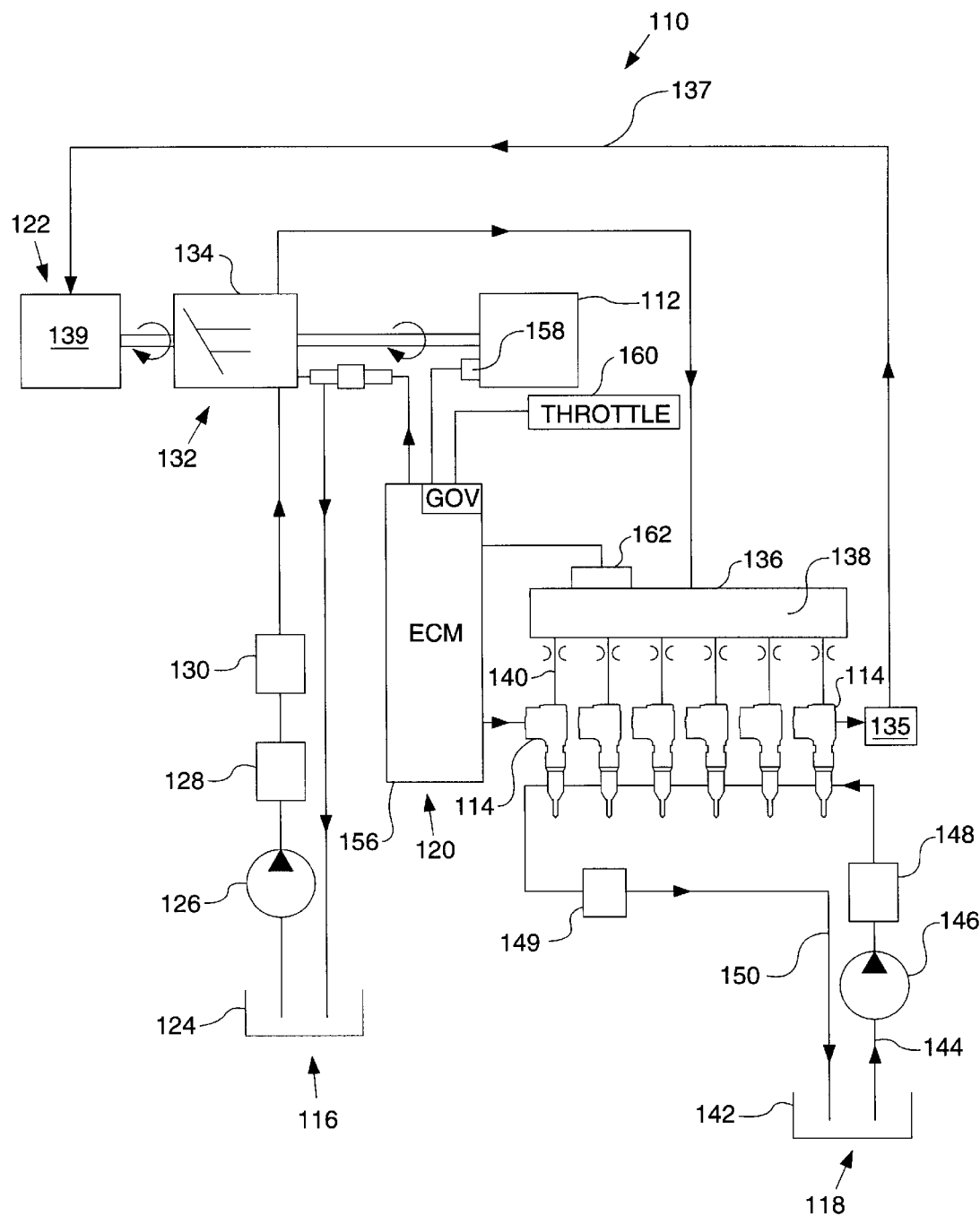
FIG. 1 is a schematic view of a fuel injection system used in connection with a preferred embodiment of the invention.

Referring to FIG. 1, there is shown a hydraulically-actuated electronically-controlled fuel injector system 110 (hereinafter referred to as "HEUI fuel system"). Typical of such systems are those shown and described in U.S. Pat. No. 5,463,996, U.S. Pat. No. 5,669,355, U.S. Pat. No. 5,673,669, U.S. Pat. No. 5,687,693, and U.S. Pat. No. 5,697,342. The exemplary HEUI fuel system is shown in FIG. 1 as adapted for a direct-injection diesel-cycle internal combustion engine 112.

HEUI fuel system 110 includes one or more hydraulically-actuated electronically-controlled injectors 114, such as HEUI injectors, each adapted to be positioned in a respective cylinder head bore of engine 112. The system 110 further includes apparatus or means 116 for supplying hydraulic actuating fluid to each injector 114, apparatus or means 118 for supplying fuel to each injector, electronic controller 120 for electronically controlling the manner in which fuel is injected by injectors 114, including timing, number of injections, and injection profile, and actuating fluid pressure of the HEUI fuel system 110 independent of engine speed and load. Apparatus or means 122 for recirculating or recovering hydraulic energy of the hydraulic actuating fluid supplied to injectors 114 is also provided.

Hydraulic actuating fluid supply means 116 preferably includes an actuating fluid sump 124, a relatively low pressure actuating fluid transfer pump 126, an actuating fluid cooler 128, one or more actuating fluid filters 130, a source or means 132 for generating relatively high pressure actuating fluid, such as a relatively high pressure actuating fluid pump 134, and at least one relatively high pressure fluid manifold 136. The actuating fluid is preferably engine lubricating oil. Alternatively, the actuating fluid could be fuel, coolant, among other fluids.

Apparatus 122 may include a waste actuating fluid control valve 135 for each injector 114, a common recirculation line 137, and a hydraulic motor 139 connected between the actuating fluid pump 134 and recirculation line 137.

Actuating fluid manifold 136, associated with injectors 114, includes a common rail passage 138 and a plurality of rail branch passages 140 extending from common rail 138 and arranged in fluid communication between common rail 138 and actuating fluid inlets of respective injectors 114. Common rail passage 138 is also arranged in fluid communication with the outlet from high pressure actuating fluid pump 134.

Fuel supplying means 118 includes a fuel tank 142, a fuel supply passage 144 arranged in fluid communication between fuel tank 142 and a fuel inlet of each injector 114, a relatively low pressure fuel transfer pump 146, one or more fuel filters 48, a fuel supply regulating valve 149, and a fuel circulation and return passage 150 arranged in fluid communication between injectors 114 and fuel tank 142. The various fuel passages may be provided in a manner commonly know in the art.

Electronic controller 120 preferably includes an electronic control module (ECM) 156, the use of which is well known in the art. ECM 156 typically includes processing means such as a microcontroller or microprocessor, a governor (GOV) such as a proportional integral derivative (PID) controller for regulating engine speed, memory for storing an instruction set and variables, and circuitry including input/output circuitry and the like. Associated with the ECM 156 are various other known circuits such as power supply circuitry, signal conditioning circuitry, and solenoid driver circuitry, among others. ECM 156 may be used to control fuel injection timing, fuel quantity injected, fuel injection pressure, number of separate injections per injection cycle, time intervals between injection segments, time duration of the injection segments, fuel quantity injected by each injection segment actuating fluid pressure, current level of the injector signal waveform, and any combination of these parameters. Each of such parameters are preferably variably controllable.

Associated with a camshaft of engine 112 is an engine speed sensor 158 which produces a signal indicative of engine speed. Engine speed sensor 158 is connected to the governor of ECM 156 for monitoring the engine speed and piston position for timing purposes. A throttle 160 is also provided and produces signals indicative of a desired engine speed, throttle 160 also being connected to the governor of ECM 156. The governor of ECM 156 determines a desired fuel quantity to be injected during an injection event. An actuating fluid pressure sensor 162 for sensing the actuating fluid pressure within common rail 138 and producing a pressure signal responsive to a pressure of the actuating fluid is also connected to ECM 156.

Each of the injectors 114 is preferably of a type such as that shown and described in one of U.S. Pat. No. 5,463,996, U.S. Pat. No. 5,669,355, U.S. Pat. No. 5,673,669, U.S. Pat. No. 5,687,693, and U.S. Pat. No. 5,697,342. However, it is recognized that the present invention could be utilized in associated with other variations of hydraulically-actuated electronically-controlled injectors.

Figure 2:
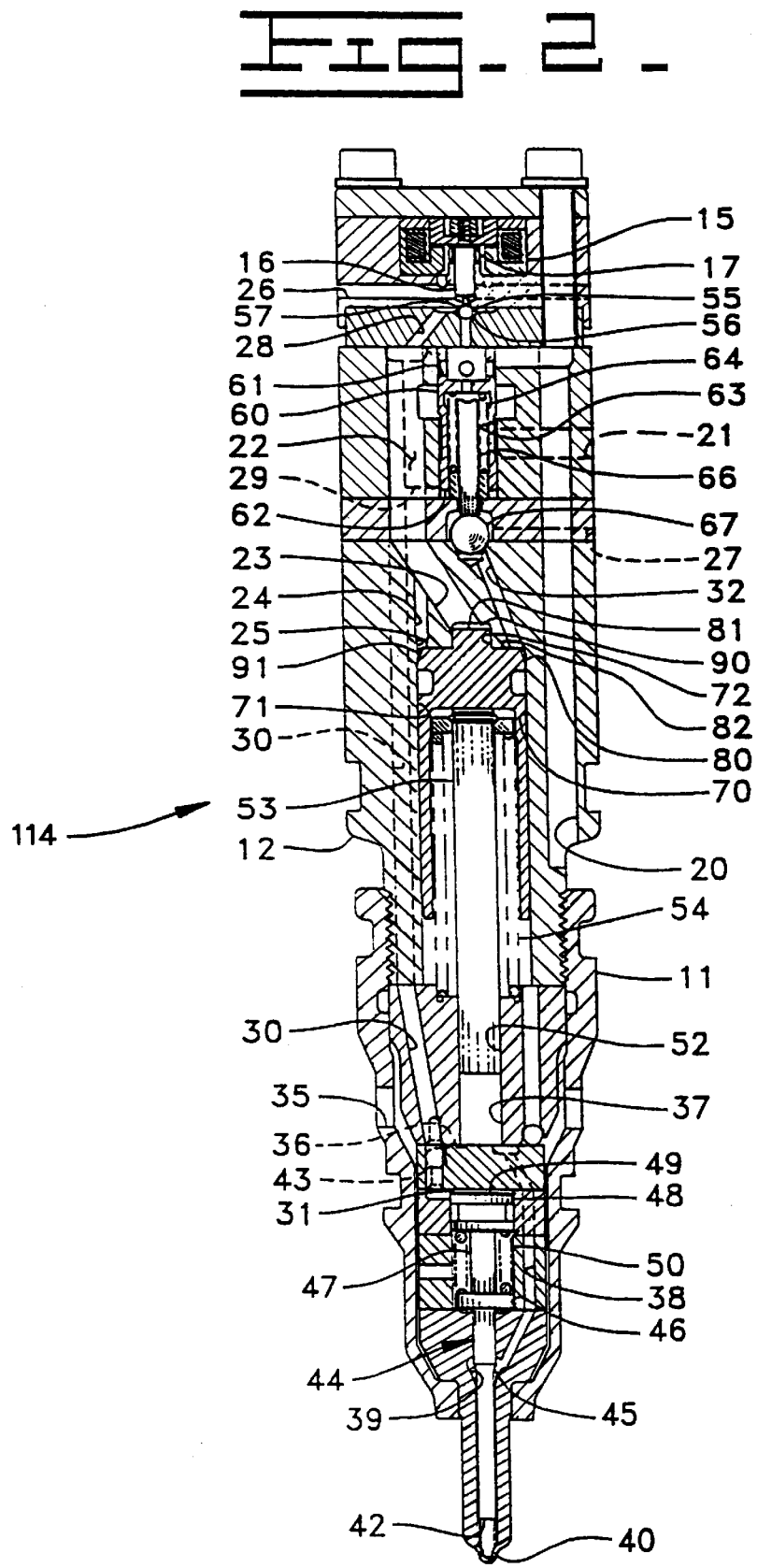
FIG. 2 is a sectioned side elevational view of a preferred embodiment of a hydraulically-actuated fuel injector used in connection with the present invention.

Referring now to FIG. 2, a sectioned side elevational view of a preferred embodiment of a HEUI injector 114 used in connection with the present invention is shown. As is described more fully in co-pending application Ser. No. 8/768014 filed on Dec. 13, 1996, fuel injection is controlled by applying an electrical current in the form of the fuel injection signal to a two-way solenoid 15, which is attached to a pin 16 and biased toward a retracted position by a spring 17. The actuation fluid control valve also includes a ball valve member 55, and a spool valve member 60. Ball valve member 55 is positioned between a high pressure seat 56 and a low pressure seat 57. When solenoid 15 is deactivated, high pressure actuation fluid acting on ball valve member 55 holds the same in low pressure seat 57 to close actuation fluid drain 26. When solenoid 15 is activated, pin 16 moves downward contacting ball valve member 55 and pushing it downward to close high pressure seat 56 and open low pressure seat 57. By actuating the solenoid 15 and seating the ball valve member 55 in the high pressure seat 56, the injector 114 begins to inject fuel. For a more detailed explanation of the preferred embodiment of the HEUI injector 114 shown in FIG. 2, reference should be made to the above described co-pending U.S. patent application Ser. No. 8/768014, which is attached hereto as Exhibit A and is incorporated herein by reference as part of the present specification.

Again referring to FIG. 2, it can be seen that the response time of a HEUI injector 114 depends, in part, on the time required to move the ball valve member 55 from the low pressure seat 57 to the high pressure seat 56. In general, the response time is partly a function of the electrical current level of the fuel injection signal and primarily a function of the pull-in current duration time and the hydraulic force opposing the ball valve member 55.

The magnitude of the electrical current applied to solenoid 15 determines the force the solenoid 15 generates on the pin 16. To begin injecting fuel, the fuel injector current level must, be sufficient to overcome the opposing hydraulic force of the actuation fluid and sufficient to seat the ball valve member 55 in the high pressure seat 56. Further, the pull-in current duration time must be sufficient to hold the ball 55 to the high pressure seat 56 of the injector 114 so that a lower current level can hold the ball 55 to the high pressure seat 56 for the remainder of the injection event. If the initial electrical current applied is too low, the solenoid 15 will generate insufficient force either to move the ball valve member 55 from the low pressure seat 57 or to seat the ball valve member 55 properly in the high pressure seat 56. Also, if the electrical current is applied for too short of a duration, the solenoid 15 will not be able to hold the ball 55 to the high pressure seat 56. In either case, the ball 55 will not remain properly seated when trying to use the lower current level to hold the ball 55 at the high pressure seat 56 for the remainder of the injection event. Therefore, the injector 114 would not work properly.

On the other hand, if the current is too high, the solenoid 15 will generate too much force on the pin 16, which will thereby move the ball valve member 55 too quickly and cause the ball valve member 55 to impact the high pressure seat 56 with a greater force than desirable. This could cause the ball valve member 55 to bounce in the seat 56, thereby delaying the beginning of fuel injection, and because the delay caused by the bouncing is unpredictable, it would also introduce variability in the fuel injector response time. Furthermore, if the current is too high, it may create a force on the pin 16 which is large enough to cause an impact force of the ball valve member 55 on the seat 56 that could damage the pin 16 and thereby shorten the working life of the injector 114 or cause the injector 114 to malfunction. Similarly, if the pull-in current is too long of a duration, then the electronics must be able to provide greater power and dissipate the resulting heat.

To move the ball valve member 55 from the low pressure seat 57 to the high pressure seat 56, it is necessary to overcome the opposing force of the actuation fluid. The opposing force of the actuation fluid depends, in part, on: 1) the pressure of the fluid; and 2) the fluid viscosity (which in turn is a function of temperature). Thus, for a constant pull-in current applied to the solenoid 15, the response time will increase as: 1) the pressure of the actuation fluid increases; and 2) the temperature of the actuation fluid decreases.

To maintain a relatively constant response time while reducing overall power requirements and minimizing the impact force generated by seating the ball valve member 55 in the high pressure seat 56, the pull-in current duration time can be varied as a function of engine temperature. An engine temperature sensor may be used to sense the temperature of the engine and then the sensed temperature of the engine may be used as an approximation of the actuating fluid viscosity. It is possible to use either an engine oil temperature sensor or an engine coolant temperature sensor to determine engine temperature. Further, it should be recognized that in some applications it will be possible to modify the pull-in current duration time based on other parameters like actuating fluid viscosity.

Referring now to FIG. 3, a flowchart of the software logic used in connection with a preferred embodiment is shown. Those skilled in the art could readily and easily write software implementing the flowchart show in FIG. 3 using the instruction set, or other appropriate language, associated with the particular microprocessor to be used. In a preferred embodiment, a Motorola MC68336 is used in the electronic controller 120. However, other known microprocessors could be readily and easily used without deviating from the scope of the present invention.

First block 301 begins the program controls. Program control passes from first block 301 to second block 302. In second block 302, the electronic controller 120 reads the engine modes, engine speed, engine load, actuating fluid pressure, desired fuel quantity, and timing. In a preferred embodiment, the electronic controller 120 periodically inputs the engine speed signal, the pressure signal responsive to the pressure of the actuating fluid, the desired speed signal or preferably the desired fuel quantity to be injected during the injection event and stores these as values in memory. Further, in a preferred embodiment, the electronic controller 120 determines the engine modes, engine load, and timing (BTDC) and also stores these values in memory. Advantageously, the values stored in memory are updated and stored in memory as appropriate depending upon characteristics of the particular value. For example, the engine speed is preferably sensed at a rate dependent upon the speed of the engine. However, other sampling frequencies could readily and easily be used without deviating from the present invention as defined by the appended claims. It is advantageous for the governor to receive the desired speed signal for the throttle, compare the desired speed signal to the engine speed signal, and determine the desired fuel quantity to be injected during the injection event and for the controller 120 to read the desired fuel quantity to be injected and store the desired fuel quantity to be injected in memory. Further, the engine load is preferably determined based upon a total fuel rate output by the governor, but could also be determined from a sensed actuating fluid pressure. In second block 302, the electronic controller 120 preferably reads the memory location that stores the engine mode values, engine speed values, engine load values, actuating fluid pressure values, desired fuel quantity values and timing values. Program control then passes to third block 303.

In third block 303, the electronic controller 120 determines the fuel injection rate waveform type. In a preferred embodiment, the electronic controller 120 determines whether a ramp, square, or split fuel injection rate waveform type would be most desirable.

The type of injection rate waveform desired will typically vary depending upon various engine operating conditions. Referring to FIG. 4, a map as a function of engine speed verses engine speeds and illustrating that at relatively low engine load is shown, relatively low engine loads, as indicated by region 400, it is often desirable to utilize what is commonly referred to as a split injection rate waveform technique, wherein a portion of the total fuel to be delivered to the engine cylinder is injected by what is commonly termed a split pilot shot event or split prime shot event and in which the remaining portion of the fuel is injected by what is commonly termed a split main shot event.

Under relatively low engine speeds and high engine loads or high engine speed and moderate engine loads, as indicated by regions 405 and 410 respectively, it is often desirable to utilize what is commonly referred to as a square injection rate waveform technique, wherein a portion of the total fuel to be delivered to the engine cylinder is initially compressed by what is commonly termed a square pilot shot event and in which the total quantity of fuel that is injected is delivered by what is commonly termed a square main shot event.

Under other combinations of engine loads and engine speeds, as indicated by region 415, it is often desirable to utilize what is commonly referred to as a ramp injection rate waveform technique, wherein the total fuel to be delivered to the engine cylinder is injected by what is commonly termed a ramp main shot event.

The foregoing injection techniques can provide advantages in terms of exhaust emissions, including reduced particulate emissions and/or reduced $NO_X$ emissions.

An exemplary current waveform for split type injection is illustrated in FIG. 5 showing a split pilot shot sub-event portion of a fuel injection signal 566 and a main shot sub-event portion of a fuel injection control signal 568, with a delay 570 therebetween. The duration of each of the signals 566 and 568 can be varied by the controller 120, and the duration of the delay 570 can also be varied by the controller 120.

Referring to FIG. 6, a graph of the fuel injection rate verses time for the split type of full injection signal of FIG. 5 is shown. The injection rate resulting from the split pilot shot increases in a ramped manner as shown at 672 because the fuel within the injector 114 is being pressurized during the split pilot shot by movement of a plunger within the injector 114. The injection rate resulting from the main shot is higher and relatively constant as shown at 674 because, even after the split pilot shot control signal ceases, plunger movement within the injector 114 continues due to inertia and the fuel is further compressed while a check valve at the injector nozzle remains closed so that no fuel is introduced into the cylinder. The quantity of fuel delivered during each split pilot shot control signal 566 and split main shot control signal 568 is represented by the area of respective regions 672 and 674. In order to accurately and consistently deliver specific fuel quantities, opening and closing of the injectors 114 must be accurately controlled by the sub-event portions of the fuel injection signals 566 and 568. As shown in FIG. 6, there will be some time lag between when the sub-event portions of the fuel injection signals 566 and 568 are turned on and off and when injection begins and stops.

An exemplary current waveform for square type injection is illustrated in FIG. 7 showing a square pilot shot sub-event portion of a fuel injection signal 766 and a square main shot sub-event portion of a fuel injection signal 768, with a delay 770 therebetween. The duration of each of the signals 766 and 768 can be varied by the controller 120, and the duration of the delay 770 can also be varied by the controller 120.

Referring to FIG. 8, a graph of the fuel injection rate versus time for the square type of fuel injection signal of FIG. 7 is shown. The injection rate resulting from the square pilot shot is zero as shown at 772. However, the fuel within the injector 114 is being pressurized during the square pilot shot event by movement of a plunger within the injector 114. The injection rate resulting from the square main shot is higher and relatively constant as shown at 874 because, even after the square pilot shot control signal ceases, plunger movement within the injector 114 continues due to inertia and the fuel is further compressed while a check valve at the injector nozzle remains closed so that no fuel is introduced into the cylinder. The quantity of fuel delivered during the square main shot control signal 768 is represented by the area of region 874. In order to accurately and consistently deliver specific fuel quantities, opening and closing of the injectors 114 must be accurately controlled by the sub-event portions of the fuel injection signals 766 and 768. As shown in FIG. 8, there will be some time lag between when the sub-event portions of the fuel injection signals 766 and 768 are turned on and off and when injection begins and stops.

An exemplary current waveform for ramp type injection is illustrated in FIG. 9, showing a ramp event fuel injection signal 966. The duration of the ramp event fuel injection signal 966 can be varied by the ECM 120.

Referring to FIG. 10, a graph of the fuel injection rate versus time for the ramp type of fuel injection signal of FIG. 9 is shown. The injection rate resulting from the ramp main event increases in a ramped manner as shown at 1072 due to the fuel within the injector 114 being pressurized during the ramp event by movement of a plunger within the injector 114. The quantity of fuel delivered during each ramp event 966 is represented by the area of region 1072. In order to accurately and consistently deliver specific fuel quantities, opening and closing of the injectors 114 must be accurately controlled by the ramp event fuel injection signal 966. As shown in FIG. 10, there will be some time lag between when the ramp event fuel injection signal 966 is turned on and off and then when injection begins and stops.

In this regard, a flowchart 1180 of operating logic steps in accordance with the present invention for determining the fuel waveform type is shown in FIG. 11. Such operating steps may be incorporated within controller 120 by appropriate programming techniques known to those skilled in the art.

Control begins at first step 1182. From first step 1182, control passes to second step 1184. In second step 1184, the controller 120 determines whether the engine is in a predetermined mode, such as a cold mode, a cranking mode or a split disabled mode. If the engine is in a predetermined mode, then it is desirable to use a waveform type which has previously been specified for such mode. Therefore, an active waveform type, that is the injection waveform type to be used for injection, is set to the type specified for the given mode at third step 1186 and the engine speed and engine load are stored in memory.

However, if the engine is not in one of such modes, then at fourth step 1188 a determination is made as to whether this is the first waveform to be determined. If it is the first waveform, at fifth step 1190 the engine speed and engine load are stored in memory so the comparisons explained below have a reference, and at sixth step 1192 an injection waveform map, preferably similar to the map shown in FIG. 4, is utilized to look up a waveform type according to the engine speed and engine load. Once the injection waveform type is looked up, the active waveform type is set to the looked up waveform type at seventh step 1194. The injection system will then utilize the active waveform type for injection purposes.

If at fourth step 1188 it is not the first waveform, then in eight step 1196 the engine speed and engine load are compared with the previously stored engine speed and engine load to determine if a change in engine speed |ENG. SPD. Δ| exceeds a speed threshold and to determine if a change in engine load |ENG. LOAD Δ| exceeds a load threshold. If neither of the two thresholds are exceeded then the current active injection waveform type will continue to be used as indicated at ninth step 1198. However, if at least one of the thresholds is exceeded then fifth, sixth, and seventh steps 1190 through 1194 are executed. Referring back to FIG. 3, once the electronic controller 120 determines the fuel waveform type, program control passes to fourth block 304 if the waveform type is a ramp, to eighth block 308 if the waveform type is a square and fourteenth block 314 if the waveform type is a split.

Fourth block 304 begins the ramp waveform program control. Program control passes from fourth block 304 to fifth block 305. In fifth block 305, the electronic controller 120 determines the main ramp event duration from a ramp event delivery map. Preferably, the ramp event delivery map is similar to table 1 below and provides the duration time for the main ramp delivery event as a function of actuation fluid pressure in megapascals (MPa) and cubic millimeters (mm$^3$) of fuel. In table 1 below, it is advantageous to populate the table with numbers representing the number of bits that when multiplied by the processing speed of the controller 120, preferably two microseconds per bit (μsec/bit), provide a time based event duration time.

invention as defined by the appended claims. Once the electronic controller 120 determines the main ramp event duration, program control then passes to sixth block 306.

TABLE 1

| | Fuel To Be Delivered (mm3) | | | | | | | | | | | | |
|---|---|---|---|---|---|---|---|---|---|---|---|---|---|
| Press (Mpa) | 0 | 0.01 | 2.8 | 2.9 | 3.17 | 3.36 | 3.4 | 3.5 | 3.6 | 3.63 | 7 | 10 | 19.8 |
| 0 | 0 | 1263 | 1277 | 1278 | 1279 | 1281 | 1281 | 1281 | 1282 | 1282 | 1338 | 1368 | 1790 |
| 3 | 0 | 1263 | 1277 | 1278 | 1279 | 1281 | 1281 | 1281 | 1282 | 1282 | 1338 | 1368 | 1790 |
| 5 | 0 | 1020 | 1044 | 1048 | 1049 | 1051 | 1052 | 1053 | 1054 | 1054 | 1095 | 1112 | 1200 |
| 6 | 0 | 911 | 937 | 938 | 940 | 942 | 943 | 944 | 945 | 945 | 990 | 1027 | 1105 |
| 7 | 0 | 839 | 865 | 866 | 868 | 870 | 871 | 872 | 873 | 873 | 918 | 943 | 1010 |
| 10 | 0 | 748 | 765 | 766 | 768 | 770 | 771 | 772 | 773 | 773 | 828 | 833 | 930 |
| 12 | 0 | 705 | 732 | 732 | 734 | 735 | 736 | 737 | 738 | 739 | 789 | 810 | 879 |
| 15 | 0 | 670 | 696 | 697 | 699 | 700 | 701 | 702 | 703 | 703 | 703 | 723 | 817 |
| 17 | 0 | 665 | 691 | 692 | 694 | 695 | 696 | 697 | 698 | 699 | 699 | 714 | 791 |
| 20 | 0 | 646 | 673 | 674 | 675 | 676 | 677 | 678 | 679 | 68i | 681 | 700 | 771 |
| 22 | 0 | 600 | 626 | 627 | 629 | 630 | 631 | 632 | 632 | 633 | 633 | 695 | 766 |
| 25.5 | 0 | 553 | 579 | 580 | 582 | 583 | 584 | 585 | 586 | 587 | 587 | 690 | 761 |
| 32.5 | 0 | 0 | 0 | 0 | 0 | 0 | 0 | 0 | 0 | 0 | 0 | 0 | 0 |

| Press (Mpa) | 24.8 | 44.8 | 78.4 | 95.1 | 129 | 148 | 172 | 185 | 200 |
|---|---|---|---|---|---|---|---|---|---|
| 0 | 2128 | 2878 | 3150 | 3150 | 3150 | 3150 | 3150 | 3150 | 3150 |
| 3 | 2128 | 2878 | 3150 | 3150 | 3150 | 3150 | 3150 | 3150 | 3150 |
| 5 | 1354 | 1858 | 2932 | 3050 | 3150 | 3150 | 3150 | 3150 | 3150 |
| 6 | 1233 | 1657 | 2498 | 2695 | 3150 | 3150 | 3150 | 3150 | 3150 |
| 7 | 1112 | 1456 | 2063 | 2339 | 2894 | 3150 | 3150 | 3150 | 3150 |
| 10 | 1004 | 1228 | 1663 | 1925 | 2458 | 2781 | 3141 | 3150 | 3150 |
| 12 | 941 | 1132 | 1489 | 1739 | 2244 | 2554 | 2884 | 3089 | 3150 |
| 15 | 873 | 1047 | 1321 | 1520 | 1930 | 2153 | 2421 | 2578 | 2743 |
| 17 | 846 | 1008 | 1258 | 1420 | 1795 | 1987 | 2206 | 2334 | 2469 |
| 20 | 824 | 961 | 1185 | 1329 | 1674 | 1875 | 2055 | 2175 | 2302 |
| 22 | 815 | 942 | 1148 | 1285 | 1616 | 1799 | 1987 | 2105 | 2228 |
| 25.5 | 806 | 923 | 1111 | 1241 | 1557 | 1723 | 1919 | 2033 | 2154 |
| 32.5 | 0 | 0 | 0 | 0 | 0 | 0 | 0 | 0 | 0 |

For example, if the desired fuel quantity to be injected is 3.63 mm$^3$ and the actuating fluid pressure is 25.50 MPa then the duration of the ramp main delivery event would be 587 bits time 2 microsec/bit which equals 1,174 microseconds or 1.174 milliseconds. Although table 1 represents a preferred look-up table for use in connection with an embodiment of the HEUI injector 114 shown in FIG. 2, the present invention is not limited to that specific table nor to those specific time values. To the contrary, it is expected that the time values may be different for different fuel injectors and actuating fluids, among other factors. The use of different time values from those shown in table 1 would nevertheless fall within the scope of the present invention as defined by the appended claims. Moreover, those skilled in the art would understand that the values determined from a map like table 1 could readily and easily be obtained from an equation and would nevertheless fall within the scope of the present In sixth block 306, the electronic controller 120 generates the fuel injection signal having the main ramp duration determined in fifth block 305 and the appropriate timing. From sixth block 306, program control passes to seventh block 307.

In seventh block 307, program control returns to the main program where the electronic controller 120 delivers the fuel injection signal determined in sixth block 306 to the fuel injector 114.

Referring back to eighth block 308, the square waveform program control begins. Program control passes from eighth block 308 to ninth block 309. In ninth block 309, the electronic controller 120 determines the main square event duration preferably from a square main event delivery map similarly to table 2 below.

TABLE 2

| | Fuel To Be Delivered (mm3) | | | | | | | | | | | | |
|---|---|---|---|---|---|---|---|---|---|---|---|---|---|
| Press (Mpa) | 0 | 0.01 | 2.8 | 2.9 | 3.17 | 3.36 | 3.4 | 3.5 | 3.6 | 3.63 | 7 | 10 | 19.81 |
| 0 | 0 | 1000 | 1110 | 1114 | 1124 | 1132 | 1133 | 1138 | 1141 | 1142 | 1275 | 1375 | 1750 |
| 3 | 0 | 1000 | 1110 | 1114 | 1124 | 1132 | 1133 | 1138 | 1141 | 1142 | 1275 | 1375 | 1750 |
| 5 | 0 | 765 | 829 | 831 | 837 | 842 | 842 | 845 | 847 | 848 | 925 | 975 | 1150 |
| 6 | 0 | 725 | 775 | 777 | 781 | 785 | 785 | 787 | 789 | 790 | 850 | 900 | 1060 |
| 7 | 0 | 705 | 720 | 750 | 750 | 755 | 756 | 758 | 760 | 761 | 615 | 865 | 1015 |
| 10 | 0 | 630 | 655 | 665 | 668 | 671 | 672 | 672 | 673 | 674 | 715 | 750 | 875 |
| 12 | 0 | 618 | 645 | 650 | 654 | 657 | 658 | 658 | 659 | 660 | 700 | 735 | 845 |
| 15 | 0 | 600 | 630 | 631 | 634 | 637 | 637 | 637 | 638 | 639 | 675 | 710 | 800 |
| 17 | 0 | 590 | 616 | 617 | 619 | 621 | 621 | 622 | 623 | 624 | 655 | 690 | 775 |

TABLE 2-continued

Fuel To Be Delivered (mm3)

| | | | | | | | | | | | | | |
|---|---|---|---|---|---|---|---|---|---|---|---|---|---|
| 20 | 0 | 575 | 595 | 596 | 597 | 599 | 599 | 600 | 600 | 601 | 625 | 655 | 735 |
| 22 | 0 | 0 | 0 | 0 | 0 | 0 | 0 | 0 | 0 | 0 | 605 | 630 | 710 |
| 25.5 | 0 | 0 | 0 | 0 | 0 | 0 | 0 | 0 | 0 | 0 | 0 | 0 | 0 |
| 32.5 | 0 | 0 | 0 | 0 | 0 | 0 | 0 | 0 | 0 | 0 | 0 | 0 | 0 |

| Press (Mpa) | 24.8 | 44.8 | 78.4 | 95.1 | 128.6 | 147.9 | 171.6 | 185.4 | 200 |
|---|---|---|---|---|---|---|---|---|---|
| 0 | 1925 | 2250 | 2250 | 2250 | 2250 | 2250 | 2250 | 2250 | 2250 |
| 3 | 1925 | 2250 | 2250 | 2250 | 2250 | 2250 | 2250 | 2250 | 2250 |
| 5 | 1250 | 1650 | 2250 | 2250 | 2250 | 2250 | 2250 | 2250 | 2250 |
| 6 | 1150 | 1485 | 2065 | 2250 | 2250 | 2250 | 2250 | 2250 | 2250 |
| 7 | 1095 | 1410 | 1950 | 2140 | 2250 | 2250 | 2250 | 2250 | 2250 |
| 10 | 935 | 1185 | 1600 | 1815 | 2225 | 2250 | 2250 | 2250 | 2250 |
| 12 | 900 | 1125 | 1495 | 1690 | 2075 | 2180 | 2250 | 2250 | 2250 |
| 15 | 845 | 1035 | 1340 | 1500 | 1850 | 2035 | 2250 | 2250 | 2250 |
| 17 | 815 | 995 | 1280 | 1435 | 1760 | 1955 | 2200 | 2250 | 2250 |
| 20 | 775 | 935 | 1190 | 1335 | 1625 | 1835 | 2100 | 2245 | 2250 |
| 22 | 750 | 895 | 1130 | 1270 | 1565 | 1755 | 2035 | 2185 | 2250 |
| 25.5 | 0 | 0 | 0 | 0 | 0 | 0 | 0 | 0 | 0 |
| 32.5 | 0 | 0 | 0 | 0 | 0 | 0 | 0 | 0 | 0 |

Preferably, the square main event delivery map provides the square main event duration time in units of the number of bits, as previously explained with reference to table 1, as a function of the desired fuel quantity to be injected during the injection event in units of millimeters cubed (mm$^3$) and actuating fluid pressure in units of megapasgals (MPa). Similar to table 1 above, when multiplied by the processing speed of the electronic controller 120, preferably two microseconds (microsecs), the number of bits shown in table 2 represents the time duration for the square main event. Although table 2 represents the preferred map of time values used in connection with an embodiment of the HEUI injector 114 shown in FIG. 2, the present invention is not limited to that specific map nor to those specific time values. To the contrary, it is expected that the time values may be different for different fuel injectors and actuation fluids, among other factors. The use of time values different from those shown in table 2 would nevertheless fall within the scope of the present invention as defined in the appended claims. Moreover, those skilled in the art would readily and easily understand that an equation could be used instead of a table like that in table 2 to determine the main square event duration. From ninth block 309, program control passes to tenth block 310.

In tenth block 310, the electronic controller 120 determines the square pilot duration. Preferably, the square pilot duration is fixed at 800 microseconds (800 microsecs). However, using a fixed value represents the preferred embodiment used in connection with an embodiment of the HEUI injector 114 show in FIG. 2. The present invention is not limited to that specific value nor to a fixed value. To the contrary, it is expected that time values could be varied depending upon different for different fuel injectors and actuation fluids, among other factors. Further, those skilled in the art would understand that the square pilot duration values could readily and easily be determined from an equation or a look-up table and would nevertheless fall within the scope of the present invention as defined by the appended claims. From tenth block 310, program control passes to eleventh block 311.

In eleventh block 311, the electronic controller 120 determines the square main delay from the square delay map. Preferably, the square main delay is a fixed value, preferably 1.3 milliseconds (1.3 msecs). Additionally, the square main delay could be readily and easily obtained from an equation. Although a fixed value is preferably used for the square main delay, the present invention is not limited to that specific value nor to using specific values. To the contrary, it is expected that different values may be used for different fuel injectors and actuating fluids, among other factors. The use of different values than those described herein would nevertheless fall within the scope of the present invention as defined by the appended claims. From eleventh block 311, program control passes to twelfth block 312.

In twelfth block 312, the electronic controller 120 generates the fuel injection signal using the main square event duration determined in ninth block 309, the square pilot duration determined in tenth block 310, and the square main delay determined in eleventh block 311 and having appropriate timing. From twelfth block 312, program control passes to thirteenth block 313.

In thirteenth block 313, program control returns to the main program where the electronic controller 120 delivers the fuel injection signal generated in twelfth block 312 to the fuel injector 114.

Referring back to fourteenth block 314, the split waveform program control begins. Program control passes from fourteenth block 314 to fifteenth block 315.

In fifteenth block 315, the electronic controller 120 determines the split pilot shot fuel quantity preferably from a split pilot fuel map. A split pilot fuel map provides information indicating the fuel allotted to the split pilot shot as a function of the desired fuel quantity to be injected during the injection event and engine speed. A preferable split pilot fuel map is shown below in table 3.

TABLE 3

| Engine Speed | Fuel To Be Delivered (mm3) | | | | | | | | | | | | | | | | | | | | |
|---|---|---|---|---|---|---|---|---|---|---|---|---|---|---|---|---|---|---|---|---|---|
| (RPM) | 0 | 0.01 | 2.8 | 2.9 | 3.17 | 3.36 | 3.4 | 3.5 | 3.6 | 3.63 | 7 | 10 | 19.81 | 24.8 | 44.8 | 78.4 | 95.1 | 128.6 | 147.9 | 171.6 | 185.4 | 200 |
| 500 | 0 | 0 | 0 | 0 | 0 | 0 | 0 | 0 | 0 | 0 | 1 | 2 | 6 | 7 | 6 | 7 | 7 | 7 | 7 | 7 | 0 | 0 |
| 600 | 0 | 0 | 0 | 0 | 0 | 0 | 0 | 0 | 0 | 1 | 2 | 6 | 7 | 6 | 7 | 7 | 7 | 7 | 7 | 7 | 0 | 0 |
| 700 | 0 | 0 | 0 | 0 | 0 | 0 | 0 | 0 | 0 | 0 | 1 | 2 | 6 | 7 | 6 | 7 | 7 | 7 | 7 | 7 | 0 | 0 |
| 800 | 0 | 0 | 0 | 0 | 0 | 0 | 0 | 0 | 0 | 0 | 1 | 2 | 6 | 7 | 6 | 7 | 7 | 7 | 7 | 7 | 0 | 0 |
| 900 | 0 | 0 | 0 | 0 | 0 | 0 | 0 | 0 | 0 | 0 | 1 | 2 | 6 | 7 | 6 | 7 | 7 | 7 | 7 | 7 | 0 | 0 |
| 1000 | 0 | 0 | 0 | 0 | 0 | 0 | 0 | 0 | 0 | 0 | 1 | 2 | 6 | 7 | 7 | 7 | 7 | 7 | 7 | 7 | 0 | 0 |
| 1100 | 0 | 0 | 0 | 0 | 0 | 0 | 0 | 0 | 0 | 0 | 1 | 2 | 6 | 7 | 7 | 7 | 7 | 7 | 7 | 7 | 0 | 0 |
| 1200 | 0 | 0 | 0 | 0 | 0 | 0 | 0 | 0 | 0 | 0 | 1 | 2 | 6 | 7 | 7 | 7 | 7 | 7 | 7 | 7 | 0 | 0 |
| 1300 | 0 | 0 | 0 | 0 | 0 | 0 | 0 | 0 | 0 | 0 | 1 | 2 | 6 | 7 | 7 | 7 | 7 | 7 | 7 | 7 | 0 | 0 |
| 1400 | 0 | 0 | 0 | 0 | 0 | 0 | 0 | 0 | 0 | 0 | 1 | 2 | 6 | 7 | 7 | 7 | 7 | 7 | 7 | 7 | 0 | 0 |
| 1500 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 1600 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 1700 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 1600 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 1900 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2000 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2100 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2200 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2300 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2400 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2500 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2600 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2700 | 0 | 0 | 0 | 0 | 0 | 0 | 0 | 0 | 0 | 0 | 1 | 2 | 6 | 7 | 7 | 7 | 0 | 0 | 0 | 0 | 0 | 0 |
| 2800 | 0 | 0 | 0 | 0 | 0 | 0 | 0 | 0 | 0 | 0 | 1 | 2 | 8 | 7 | 7 | 7 | 0 | 0 | 0 | 0 | 0 | 0 |
| 2900 | 0 | 0 | 0 | 0 | 0 | 0 | 0 | 0 | 0 | 0 | 1 | 2 | 6 | 1 | 7 | 7 | 0 | 0 | 0 | 0 | 0 | 0 |
| 3000 | 0 | 0 | 0 | 0 | 0 | 0 | 0 | 0 | 0 | 0 | 1 | 2 | 6 | | | | | | | | | |

In table 3, fuel in cubic millimeters (mm$^3$) to be injected during the split pilot shot is provided as a function of engine speed and revolutions per minute (RPM) and cubic millimeters (mm$^3$) of total fuel desired to be delivered. For example, if the engine speed is 1,900 RPMs and the desired fuel quantity to be injected during the injection event is 60 mm$^3$, then 7 mm$^3$ of fuel would preferably be allotted to the pilot shot event. Although table 3 represents the preferred pilot shot fuel quantity values used in connection with an embodiment of the HEUI injector 114 shown in FIG. 2, the present invention is not limited to that specific table nor to those specific values. To the contrary, it is expected that the pilot shot fuel quantity values may be different for different fuel injectors and actuation fluids, among other factors. The use of pilot shot fuel quantity values different than those shown in table 3 would nevertheless fall within the scope of the present invention as defined by the appended claims. From fifteenth block 315, program control passes to sixteenth block 316.

In sixteenth block 316, the electronic controller 120 determines the split main shot fuel quantity desired to be delivered by reading the output of the governor which provides a total desired fuel signal value and subtracting the pilot shot fuel quantity determined in fifteenth block 315. However, it should be understood that the split main shot fuel quantity desired to be delivered could be determined by the electronic controller 120 and subtracted from the total desired fuel signal value to determine the pilot shot fuel quantity and would nevertheless fall within the scope of the present invention as defined by the appended claims. From sixteenth block 316, program control passes to seventeenth block 317.

In seventeenth block 317, the electronic controller 120 determines the split pilot shot duration. Preferably, the split pilot shot duration is determined from a split pilot fuel delivery map. However, those skilled in the art would readily and easily recognize that the information provided in a split pilot fuel delivery map could easily and readily be provided by using an appropriate equation. Advantageously, the ramp event delivery map as shown in table 1 above is used for the split pilot fuel delivery map. However, it is expected that the split pilot shot duration time values may be different for different fuel injectors and actuation fluids, among other factors. The use of split pilot shot duration time values different than those shown in table 1 or different from those values used for the ramp event delivery map would nevertheless fall within the scope of the present invention as defined in the appended claims. From seventeenth block 317, program control passes to eighteenth block 318.

In eighteenth block 318, the electronic controller 120 determines the main shot duration. Preferably, the electronic controller 120 determines the main shot duration from the split main event delivery map.

Preferably, the electronic controller 120 uses a split main event delivery map to determine the split main shot fuel quantity. Advantageously, the split main event delivery map is similar to table 4 below.

TABLE 4

Fuel To Be Delivered (mm3)

| Press (Mpa) | 0 | 0.01 | 2.8 | 2.9 | 3.17 | 3.36 | 3.4 | 3.5 | 3.6 | 3.63 | 7 | 10 | 19.81 |
|---|---|---|---|---|---|---|---|---|---|---|---|---|---|
| 0 | 0 | 1000 | 1110 | 1114 | 1124 | 1132 | 1133 | 1138 | 1141 | 1142 | 1275 | 1375 | 1750 |
| 3 | 0 | 1000 | 1110 | 1114 | 1124 | 1132 | 1133 | 1138 | 1141 | 1142 | 1275 | 1375 | 1750 |
| 5 | 0 | 765 | 829 | 831 | 837 | 842 | 842 | 845 | 847 | 848 | 925 | 975 | 1150 |
| 6 | 0 | 725 | 775 | 777 | 781 | 785 | 785 | 787 | 789 | 790 | 850 | 900 | 1060 |
| 7 | 0 | 705 | 720 | 750 | 750 | 755 | 756 | 758 | 760 | 761 | 815 | 865 | 1015 |
| 10 | 0 | 630 | 655 | 665 | 668 | 671 | 672 | 672 | 673 | 674 | 715 | 750 | 875 |
| 12 | 0 | 618 | 645 | 650 | 654 | 657 | 658 | 658 | 659 | 660 | 700 | 735 | 845 |
| 15 | 0 | 600 | 630 | 631 | 634 | 637 | 637 | 637 | 638 | 639 | 675 | 710 | 800 |
| 17 | 0 | 590 | 616 | 617 | 619 | 621 | 621 | 622 | 623 | 624 | 655 | 690 | 775 |
| 20 | 0 | 575 | 595 | 596 | 597 | 599 | 599 | 600 | 600 | 601 | 625 | 655 | 735 |
| 22 | 0 | 0 | 0 | 0 | 0 | 0 | 0 | 0 | 0 | 0 | 605 | 630 | 710 |
| 25.5 | 0 | 0 | 0 | 0 | 0 | 0 | 0 | 0 | 0 | 0 | 0 | 0 | 0 |
| 32.5 | 0 | 0 | 0 | 0 | 0 | 0 | 0 | 0 | 0 | 0 | 0 | 0 | 0 |

| Press (Mpa) | 24.8 | 44.8 | 78.4 | 95.1 | 128.6 | 147.9 | 171.6 | 185.4 | 200 |
|---|---|---|---|---|---|---|---|---|---|
| 0 | 1925 | 2250 | 2250 | 2250 | 2250 | 2250 | 2250 | 2250 | 2250 |
| 3 | 1925 | 2250 | 2250 | 2250 | 2250 | 2250 | 2250 | 2250 | 2250 |
| 5 | 1250 | 1650 | 2250 | 2250 | 2250 | 2250 | 2250 | 2250 | 2250 |
| 6 | 1150 | 1485 | 2065 | 2250 | 2250 | 2250 | 2250 | 2250 | 2250 |
| 7 | 1095 | 1410 | 1950 | 2140 | 2250 | 2250 | 2250 | 2250 | 2250 |
| 10 | 935 | 1185 | 1600 | 1815 | 2225 | 2250 | 2250 | 2250 | 2250 |
| 12 | 900 | 1125 | 1495 | 1690 | 2075 | 2180 | 2250 | 2250 | 2250 |
| 15 | 845 | 1035 | 1340 | 1500 | 1850 | 2035 | 2250 | 2250 | 2250 |
| 17 | 815 | 995 | 1280 | 1435 | 1760 | 1955 | 2200 | 2250 | 2250 |
| 20 | 775 | 935 | 1190 | 1335 | 1625 | 1835 | 2100 | 2245 | 2250 |
| 22 | 750 | 895 | 1130 | 1270 | 1565 | 1755 | 2035 | 2185 | 2250 |
| 25.5 | 0 | 0 | 0 | 0 | 0 | 0 | 0 | 0 | 0 |
| 32.5 | 0 | 0 | 0 | 0 | 0 | 0 | 0 | 0 | 0 |

In table 4, the number of bits represent the duration of the split main shot event and are shown as a function of the cubic millimeters (mm$^3$) of fuel to be delivered for the event and the actuating fluid pressure in megapascals (MPa). Similarly, to determine the time duration of the split main shot fuel event the number of bits multiplied by the processor speed of two microseconds (2 ms). For example, if seven cubic millimeters (7 mm$^3$) is the fuel to be delivered during the split main shot event and the actuating fluid pressure is 22 megapascals (22 MPa), then the number of bits representing the duration of the split main shot event would be 605 bits. Multiplying 605 bits by the processing speed (2 microseconds) gives a split main shot duration of 1,210 microseconds, or 1.21 milliseconds. Although table 4 represents the preferred map of split main shot event duration values used in connection with an embodiment of the HEUI injector 114 shown in FIG. 2, the present invention is not limited to that specific table nor to those specific values. To the contrary, it is expected that the split main shot event duration values may be different for different fuel injectors and actuation fluids, among other factors. The use of values different from those shown in table 4 would nevertheless fall within the scope of the present invention as defined by the appended claims. From eighteenth block 318, program control passes to nineteenth block 319.

In nineteenth block 319, the electronic controller 120 determines the main delay. Preferably, the main delay is determined from a split main delay map. Preferably, the split main delay map is similar to table 5 below.

TABLE 5

| Engine Speed (RPM) | Delay (milliseconds) |
|---|---|
| 500 | 1.6 |
| 600 | 1.6 |
| 700 | 1.6 |
| 800 | 1.6 |
| 900 | 1.6 |
| 1000 | 1.6 |
| 1100 | 1.6 |
| 1200 | 1.6 |
| 1300 | 1.6 |
| 1400 | 1.6 |
| 1500 | 1.6 |
| 1600 | 1.6 |
| 1700 | 1.6 |
| 1800 | 1.6 |
| 1900 | 1.52 |
| 2000 | 1.44 |
| 2100 | 1.44 |
| 2200 | 1.36 |
| 2300 | 1.36 |
| 2400 | 1.28 |
| 2500 | 1.28 |
| 2600 | 1.2 |
| 2700 | 1.12 |
| 2800 | 1.04 |
| 2900 | 1.04 |
| 3000 | 1.04 |

Table 5 shows the values for the main delay in milliseconds as a function of the speed of the engine in RPM. For example, if the engine speed is 1,900 RPM, then the main delay would be 1.52 milliseconds. It should be understood that interpolation can be used to obtain values from Tables 1–5. Although table 5 represents the preferred map of main delay values used in connection with an embodiment of the HEUI injector 114 shown in FIG. 2, the present invention is not limited to that specific table nor to those specific values. To the contrary, it is expected that main delay time values may be different for different fuel injectors and actuation fluids, among other factors. The use of main delay values different than those show in table 5 would nevertheless fall within the scope of the present invention as defined by the appended claims. From nineteenth block 319, program control passes to twentieth block 320.

In twentieth block 320, the electronic controller 120 generates the fuel injecting signal having the pilot shot fuel quantity and duration, the main delay and the main shot fuel quantity and duration determined in the fifteenth through nineteenth program blocks 315–319, respectively, and delivers the fuel injection signal having appropriate time to the fuel injector 114. From twentieth program block 320, program control passes to twenty-first block 321.

In twenty-first block 321, program controls returns to the main program. The logic of FIG. 3 is performed every control loop to help insure that the injection event, including subevents, is as close as possible to the injection event actually required to produce the expected power and emissions output of the engine. However, those skilled in the art know that the aspects of the injection event could be determined at other frequencies depending on factors like the rate of change of engine speed and actuating fluid pressure without deviating from the invention as defined by the appended claims.

While aspects of the present invention have been particularly shown and described with reference to the preferred embodiment above, it will be understood by those skilled in the art that various additional embodiments may be contemplated without departing from the spirit and scope of the present invention. For example, instead of maps similar to those represents by table 1–5 having varying values, substantially fixed values could be used. However, a device or method incorporating such additional embodiments should be understood to fall within the scope of the present invention as determined based upon the claims below and any equivalents thereof.

INDUSTRIAL APPLICABILITY

Electronically controlled fuel injectors typically inject fuel into a specific engine cylinder as a function of a fuel injection signal received from an electronic controller. To control the power and emissions output of an internal combustion engine precisely, it is necessary to consistently control the timing and quantity of fuel injected into the engine cylinders. Further, tailoring the injection event, including sub-event(s), with respect to quantity of fuel delivered to a combustion chamber, injection rate of fuel delivered, portioning of fuel delivered and timing of such aspects of a fuel injection event, is one way in which to control the power and emissions of an internal combustion engine. Therefore, at different engine operating conditions it is desirable to control particular aspects of a fuel injection event differently.

Therefore, it is desirable to have a hydraulically-actuated electronically-controlled fuel injection system mechanically capable of consistently controlling aspects of the injection event and that can consistently provide a variety of achievable fuel injection waveform types. To this end, the present invention utilizes different fuel injection signal current waveforms to consistently provide a variety of achievable injection rate waveform types. Therefore, the control and method of the present invention, when compared with the previously proposed prior art control systems and methods has the advantages of overcoming problems that can adversely affect power and emission outputs and fuel economy like variations in the rate of injection, injecting fuel too rapidly within a given injection event, allowing fuel to be injected too soon or beyond a desired stopping point, variations in the pressure of the fuel being injected and variations in the dispersion of the fuel throughout the combustion chamber.

It should be understood that the invention is not limited to the exact details of construction, operation, materials, or embodiments shown and described, as obvious modifications and equivalents will be apparent to one skilled in the art. Therefore, other aspects, objects and advantages of the present invention can be obtained from a study of the drawings, the disclosure and the appended claims. Accordingly, the invention is, therefore, to be limited only by the scope of the appended claims.

We claim:

1. A compression engine having an electronic control system, comprising:

a hydraulically actuated electronic unit fuel injector mounted to the engine, capable of producing an injection event capable of having sub-events and connected to a source of actuating fluid;

an electronic controller electrically connected to said hydraulically actuated electronic unit fuel injector;

an engine speed sensor producing an engine speed signal responsive to a speed of said engine and communicating the engine speed signal to the controller;

a throttle producing a desired speed signal being indicative of a desired speed of the engine and communicating the desired speed signal to the controller;

a pressure sensor associated with the actuating fluid, electrically connected to the electronic controller, producing a pressure signal responsive to a pressure of the actuating fluid and communicating the pressure signal to the controller; and wherein said electronic controller delivers to said hydraulically actuated electronic unit fuel injector a fuel injection signal having one or more of a plurality of waveforms for controlling the sub-events and being generated from one or more of a plurality of fuel delivery maps as a function of the desired speed of the engine, the engine speed signal and the pressure signal.

2. The compression engine of claim 1, wherein the controller receives the desired speed signal, determines the desired fuel quantity to be injected during the injection event and determines the desired speed of the engine as a function of the desired fuel quantity to be injected during the injection event.

3. An electronic control system for consistently controlling the amount of fuel injected to an engine by a hydraulically actuated electronic unit fuel injector mounted to the engine, connected to a source of actuating fluid and capable of producing an injection event having sub-events, comprising:

an electronic controller electrically connected to said hydraulically actuated electronic unit fuel injector;

an engine speed sensor producing an engine speed signal responsive to a speed of said engine and communicating the engine speed signal to the controller;

a throttle producing a desired speed signal being indicative of a desired speed of the engine and communicating the desired speed signal to the controller;

a pressure sensor associated with the actuating fluid, electrically connected to the electronic controller, producing a pressure signal responsive to a pressure of the actuating fluid and communicating the pressure signal to the controller; and wherein said electronic controller delivers to said hydraulically actuated electronic unit fuel injector a fuel injection signal having one or more of a plurality of waveforms for controlling the sub-events and being generated from one or more of a plurality of fuel delivery maps as a function of the desired speed of the engine, the engine speed signal and the pressure signal.

4. The electronic control system of claim 3, wherein the controller receives the desired speed signal, determines the desired fuel quantity to be injected during the injection event as a function of the desired speed signal and determines the desired speed of the engine as a function of the desired fuel quantity to be injected during the injection event.

5. The electronic control system of claim 4, wherein the fuel injection signal has a split waveform.

6. The electronic control system of claim 5, wherein the split waveform is generated from a split pilot fuel delivery map, a split main event delivery map, a split main delay map and a split pilot fuel map.

7. The electronic control system of claim 6, wherein the split pilot fuel delivery map provides waveform information to the controller as a function of the pressure signal and the desired fuel quantity to be injected during the injection event.

8. The electronic control system of claim 7, wherein the split pilot fuel delivery map is a ramp event delivery map.

9. The electronic control system of claim 6, wherein the split main event delivery map provides waveform information to the controller as a function of the pressure signal and the desired fuel quantity to be injected during the injection event.

10. The electronic control system of claim 6, wherein the split main delay map provides waveform information to the controller as a function of the engine speed signal.

11. The electronic control system of claim 6, wherein the split pilot fuel map provides waveform information to the controller as a function of the engine speed signal and the desired fuel quantity to be injected during the injection event.

12. The electronic control system of claim 4, wherein the fuel injection signal has a square waveform.

13. The electronic control system of claim 12, wherein the square waveform is generated from a square pilot event delivery map, a square delay map and a square main event delivery map.

14. The electronic control system of claim 13, wherein the square pilot event delivery map provides waveform information to the controller as a function of the pressure signal and the engine speed signal.

15. The electronic control system of claim 14, wherein the square pilot event delivery map is a constant value.

16. The electronic control system of claim 13, wherein the square delay map provides waveform information to the controller as a function of the engine speed signal.

17. The electronic control system of claim 13, wherein the square main delay map is a constant value.

18. The electronic control system of claim 13, wherein the square main event delivery map provides waveform information to the controller as a function of the pressure signal and the desired fuel quantity to be injected during the injection event.

19. The electronic control system of claim 4, wherein the fuel injection signal has a ramp waveform.

20. The electronic control system of claim 19, wherein the ramp waveform is generated from a ramp event delivery map.

21. The electronic control system of claim 20, wherein the ramp event delivery map provides waveform information to the controller as a function of the pressure signal and the desired fuel quantity to be injected during the injection event.

22. A method for consistently controlling the amount of fuel injected to an engine by a hydraulically actuated electronic unit fuel injector mounted to the engine, connected to a source of actuating fluid and capable of producing an injection event having sub-events, comprising the steps of:

producing an engine speed signal responsive to a speed of said engine;

producing a desired speed signal indicative of a desired speed of the engine;

producing a pressure signal responsive to a pressure of the actuating fluid;

generating a fuel injection signal having one or more of a plurality of waveforms for controlling the sub-events; and delivering to said hydraulically actuated electronic unit fuel injector the fuel injection signal.

23. The method, as set forth in claim 22, wherein the step of generating a fuel injection signal having one or more of a plurality of waveforms for controlling the sub-events includes the step of using one or more of a plurality of delivery maps relating the desired speed of the engine, the engine speed signal and the pressure signal to the one or more of a plurality of waveforms for controlling the sub-events.

24. The method, as set forth in claim 23, including the steps of:

receiving the desired speed signal;

determining the desired fuel quantity to be injected during the injection event as a function of the desired speed signal; and determining the desired speed of the engine as a function of the desired fuel quantity to be injected during the injection event.

25. The method, as set forth in claim 24, wherein the step of generating a fuel injection signal having one or more of a plurality of waveforms for controlling the sub-events includes the step of generating the fuel injection signal having a split waveform.

26. The method, as set forth in claim 25, including the step of generating the split waveform from a split pilot event delivery map, a split main event delivery map, a split main delay map and a pilot fuel map.

27. The method, as set forth in claim 24, wherein the step of generating a fuel injection signal having one or more of a plurality of waveforms for controlling the sub-events includes the step of generating the fuel injection signal having a square waveform.

28. The method, as set forth in claim 27, including the step of generating the square waveform from a square pilot event delivery map, a square main delay map and a square main event map.

29. The method, as set forth in claim 24, wherein the step of generating a fuel injection signal having one or more of a plurality of waveforms for controlling the sub-events includes the step of generating the fuel injection signal having a ramp waveform.

30. The method, as set forth in claim 29, including the step of generating the ramp waveform from the ramp event delivery map.

31. An electronic control system for consistently controlling the amount of fuel injected to an engine by a hydraulically actuated electronic unit fuel injector mounted to the engine, connected to a source of actuating fluid and capable of producing an injection event having sub-events, comprising:

an electronic controller electrically connected to said hydraulically actuated electronic unit fuel injector;

an engine speed sensor producing an engine speed signal responsive to a speed of said engine and communicating the engine speed signal to the controller;

a throttle producing a desired speed signal being indicative of a desired speed of the engine and communicating the desired speed signal to the controller;

a pressure sensor associated with the actuating fluid, electrically connected to the electronic controller, producing a pressure signal responsive to a pressure of the actuating fluid and communicating the pressure signal to the controller; and wherein said electronic controller delivers to said hydraulically actuated electronic unit fuel injector a fuel injection signal having one or more of a plurality of waveforms for controlling the sub-events and being generated from one or more of a plurality of equations.

32. The electronic control system of claim 31, wherein the one or more of a plurality of equations are a function of the desired speed of the engine, the engine speed signal and the pressure signal.

33. The electronic control system of claim 32, wherein the controller receives the desired speed signal, determines the desired fuel quantity to be injected during the injection event as a function of the desired speed signal and determines the desired speed of the engine as a function of the desired fuel quantity to be injected during the injection event.

* * * * *